July 21, 1942.   C. G. FLYGARE   2,290,832
HYDRAULICALLY OPERATED MACHINE TOOL TABLE
Filed March 25, 1940   4 Sheets-Sheet 2

Inventor
CARL G. FLYGARE
By George C. Crompton Jr.
Attorney

July 21, 1942.　　　　C. G. FLYGARE　　　　2,290,832
HYDRAULICALLY OPERATED MACHINE TOOL TABLE
Filed March 25, 1940　　　　4 Sheets-Sheet 3
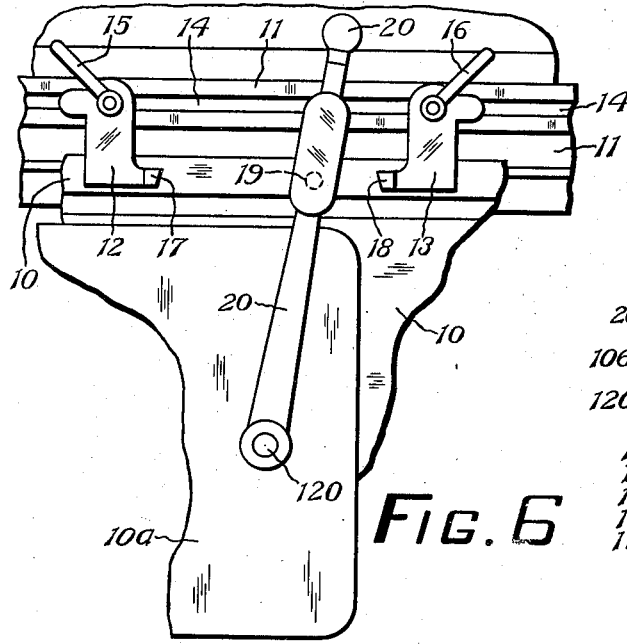
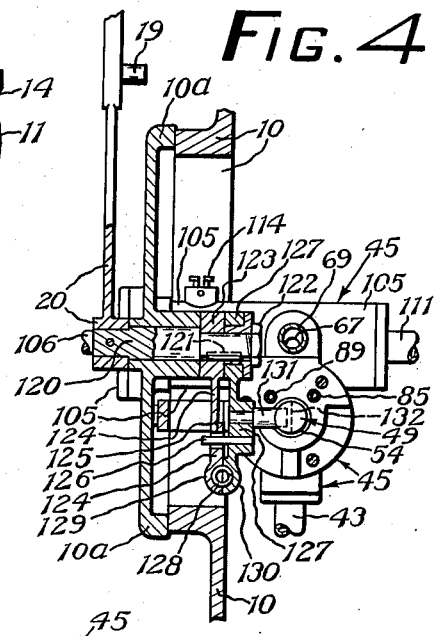
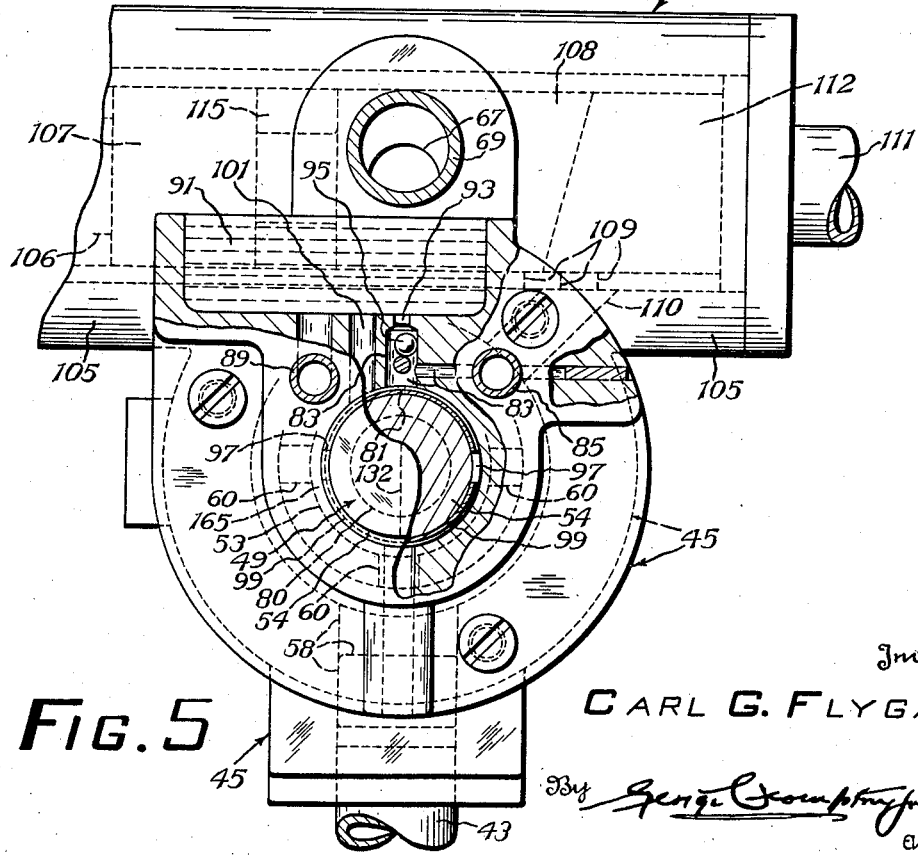
Inventor
CARL G. FLYGARE
By George Crompton Jr.
Attorney

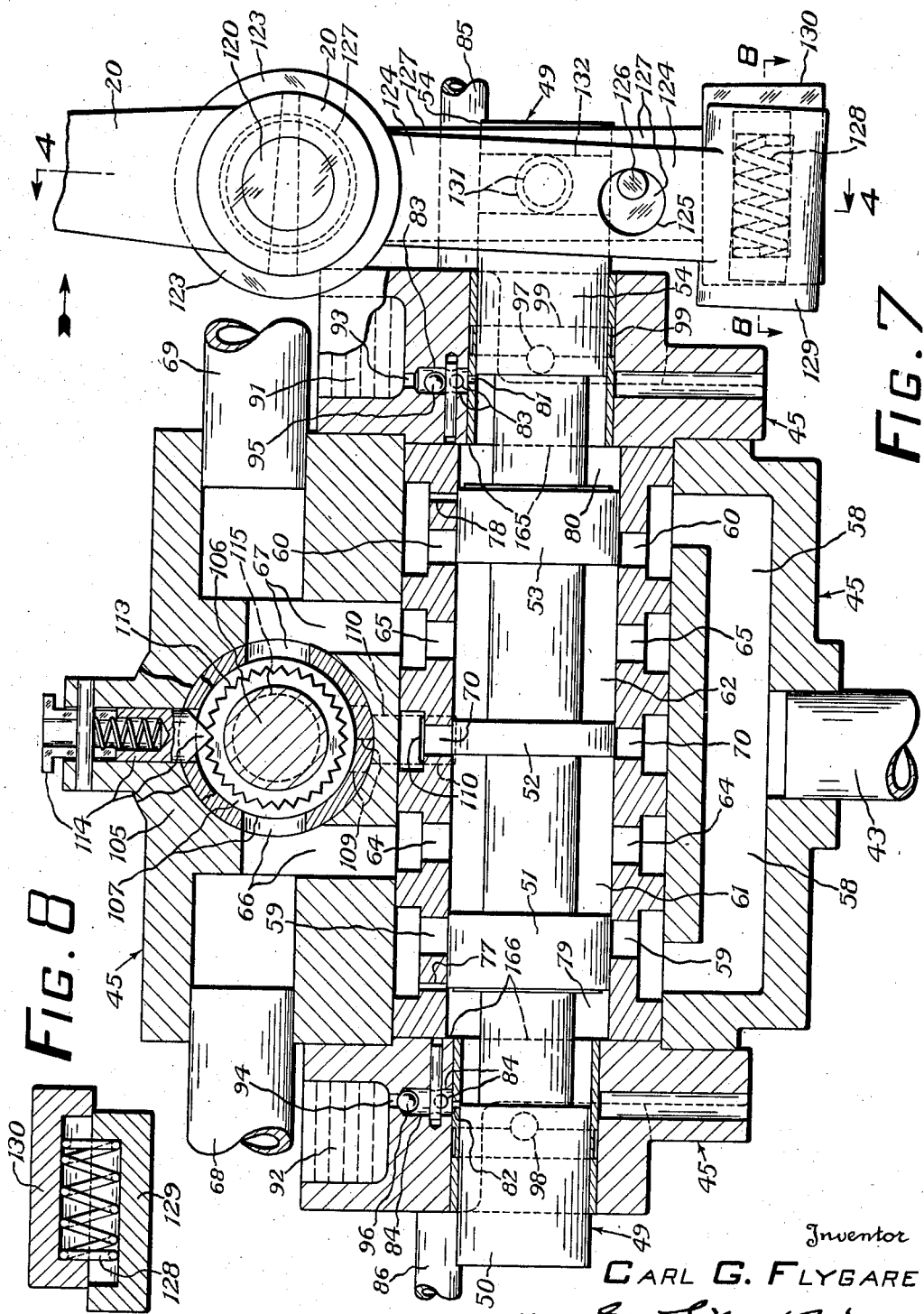

Patented July 21, 1942

2,290,832

UNITED STATES PATENT OFFICE 2,290,832

HYDRAULICALLY OPERATED MACHINE TOOL TABLE

Carl G. Flygare, Worcester, Mass., assignor to Norton Company, Worcester, Mass., a corporation of Massachusetts Application March 25, 1940, Serial No. 325,733

1 Claim. (Cl. 121—45)

The invention relates to hydraulically operated machine tool tables or carriages and with regard to its more specific features to a hydraulic actuating and controlling mechanism for the reciprocatory traversing table or carriage of a grinding machine. This application is a continuation in part of my application Serial No. 224,338 filed August 11, 1938 (now abandoned).

One object of the invention is to improve the hydraulic system of the patent to Wallace H. Wood, No. 2,071,677. Another object of the invention is to provide apparatus of the type indicated with enough controls to vary the dwell at either end of the stroke of such a table or carriage. Another object of the invention is to provide a dwell control apparatus susceptible of adjustment to vary the dwell within wide limits. Another object of the invention is to hold a grinding wheel relatively stationary adjacent a shoulder on the work piece for one or more revolutions of said work piece. Another object of the invention is to provide a simple apparatus of the type indicated. Another object of the invention is to provide a fluid pressure actuating mechanism including a dwell control of simple and practical construction. Another object of the invention is to provide a grinder which can grind shouldered work accurately. Other objects will be in part obvious or in part pointed out hereinafter.

The invention accordingly consists in the features of construction, combinations of elements, and arrangements of parts, all as will be illustratively described herein and the scope of the application of which will be indicated in the following claim.

In the accompanying drawings illustrating one of many possible embodiments of the mechanical features of this invention, Figure 1 is a view partly in section and partly in diagram, illustrating a hydraulic actuating mechanism constructed in accordance with the invention;

Figure 4 is a sectional view taken on the line 4—4 of Figure 7;

Figure 5 is an end view of the reversing valve;

Figure 6 is a front elevation of the reversing controlling mechanism;

Figure 7 is a vertical sectional view on an enlarged scale of the reversing valve, showing part of the reversing lever and associated parts in front elevation; and Figure 8 is a sectional view taken on the line 8—8 of Figure 7.

The invention, in its preferred form, makes use of the hydraulic operating mechanism of U. S. Letters Patent No. 2,071,677 issued on application of Wallace H. Wood, February 23, 1937.

Figure 1:
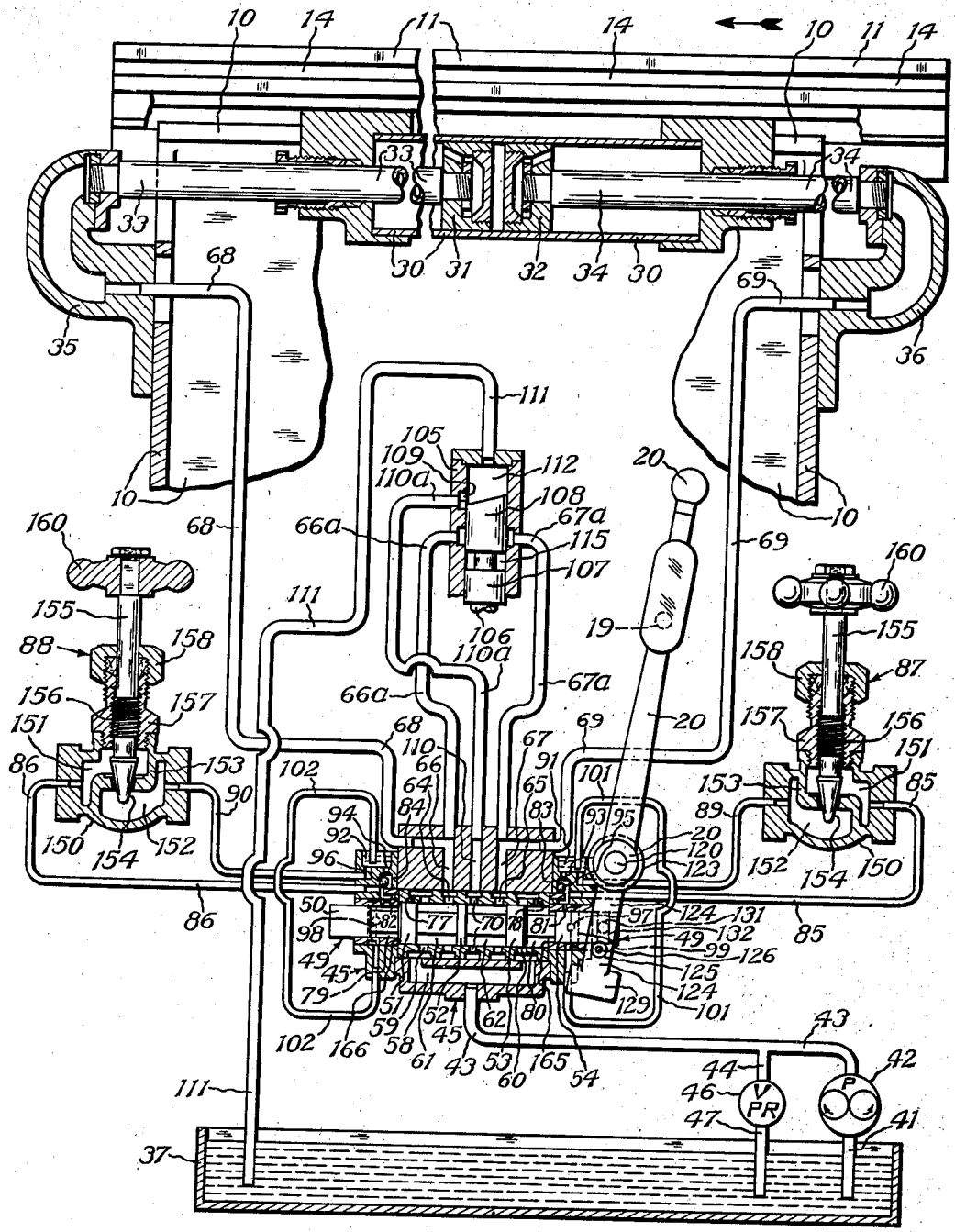

Referring now to Figure 1, the machine embodying this invention comprises a base 10 which supports a work table or carriage 11 on the usual ways (not shown) for a longitudinal reciprocating movement relative to the base. It is well understood in the grinding machine art that reciprocatory movement of the table or carriage 11 is used to traverse a work piece (usually held by the table or carriage 11) with respect to a rotating grinding wheel for the grinding of the work piece. However, so far as the present invention is concerned, the grinding wheel may be mounted on the table or carriage and the present invention has application to external cylindrical grinders for shaft grinding, also to surface grinders, internal grinders and other types. For grinding shafts having shoulders the invention is particularly useful because it is often desired to grind right up close to the shoulders, and such grinding requires accuracy of adjustment of the reciprocatory stroke of the table or carriage to within very close limits. Also when a grinding wheel or work piece is reciprocated, one with respect to the other, and no provision is made for causing the wheel to dwell at the ends of the stroke, there is a tendency to take off less metal at the ends of the stroke than in the intermediate portion thereof. In fact, if a constant speed reciprocatory traverse without any dwell be assumed, it will be seen that in any one complete reciprocation there will be parts of the work piece within the locus of the traverse which will not be touched by the grinding wheel. For this and other reasons a considerable dwell is desired in the motion of reciprocation of the table of a grinding machine and it is desirable to have the time of dwell adjustable.

Referring now to Figures 4 and 6, there are provided table dogs 12 and 13 adjustably mounted in a T-slot 14 on the front of the table or carriage 11, the dogs being locked in the desired position of adjustment by cam or wedge devices operated by handles 15 and 16. The dogs 12 and 13 have striking portions 17 and 18 which alternately engage a pin or projection 19 on a reversing lever 20 which may also be operated by hand. The length of the stroke of the table or carriage as well as the position thereof relative to the other machine parts is determined by the setting of the dogs 12 and 13, and the further mechanism to be described initiates reversal of the direction of traverse after the striking portion 17 or 18 engages the projection 19. According to the present invention the striking portions 17 and 18 of the dogs 12 and 13 may be in contact with the projection 19 of the reversing lever 20 for a long time at reversal, or the mechanism may be adjusted so that reversal is rapid at one end and slow at the other end. Furthermore, the present invention may involve an actual full stop of the table at reversal as distinguished from a slow creeping movement thereof. That is to say, the table may be maintained in stop position for a period of time measured even in minutes.

Referring now to Figure 1, a fluid pressure mechanism is provided to reciprocate the table 11. In the form illustrated, a cylinder 30 is fastened to the under side of the table 11. The cylinder contains a pair of spaced pistons 31 and 32 which are connected by a pair of hollow piston rods 33 and 34, respectively, with a pair of hollow brackets 35 and 36, respectively, which are fastened to opposite ends of the base 10.

In the preferred construction, the base 10 is box-like, the lower portion serving as a reservoir 37 for the fluid pressure system. Fluid is drawn from the reservoir through a pipe 41 by a pump 42 and is forced through a pipe 43 past a pipe 44 to a table control valve 45. A fluid pressure relief valve 46 is provided at the end of the pipe 44 to allow fluid under pressure to return to the reservoir through a pipe 47 in case the pressure within the system increases above a desired pressure.

The control valve 45 preferably combines the functions of a reversing valve and a pilot valve, so that the reversing lever 20 serves to move the valve member only to a median position and then fluid under pressure moves the valve member the remaining distance to effect reversal, producing thereby a smooth reversal of the table movement without the necessity of providing a plurality of valves. In the form illustrated, I provide a piston type valve member 49 having a plurality of pistons 50, 51, 52, 53 and 54 integrally formed thereon. Fluid under pressure from the pump 42 is forced through the pipe 43 into a chamber 58 within the casing of the valve 45. The chamber 58 is directly connected to ports 59 and 60.

Referring now to Figures 1, 2, 3 and 7, between the pistons 51 and 52 is a movable valve chamber 61. Between the pinions 52 and 53 is a corresponding but opposite valve chamber 62. There are provided ports 64 and 65 equally spaced from the center of the casing of the valve 45 which lead to chambers 66 and 67, respectively, which chambers are respectively connected to pipes 68 and 69 that are connected respectively to the hollow brackets 35 and 36. In the position of the valve piston 49 shown in Figure 1, the port 59 is uncovered and fluid is flowing through the port 64 and chamber 66 to pipe 68 to the left-hand side of the cylinder 30 and fluid is exhausting from the cylinder 30 via the pipe 69, chamber 67, port 65, chamber 62 through an exhaust port 70 located right between the ports 64 and 65.

Referring to Figures 1, 2, 3 and 7, outside of the ports 59 and 60 I provide narrow ports 77 and 78 which are connected with the main pressure chamber 58 and serve, at times, to admit fluid under pressure to chambers 79 and 80 for pilot actuation of the valve member 49. The chamber 79 is bounded by the piston portions 50 and 51, the latter being larger, so that fluid under pressure in the chamber 79 urges the valve member 49 to the right. Similarly, the chamber 80 is bounded by the piston portions 53 and 54, the former being larger, so that fluid under pressure in the chamber 80 urges the valve member 49 to the left.

In the preferred form of the present invention the reversal takes place in the following manner: One of the table dogs 12 or 13 strikes the pin 19 of the reversing lever 20. This, of course, moves the reversing lever but it is connected to the valve member 49 by a lost motion connection and a spring to be hereinafter described and, furthermore, the pilot pressure opposes movement of the valve member 49, so that the first action is to compress the spring and take up the lost motion. When this has happened, the valve member 49 must move if it be assumed that the table actuating force is greater than the pilot force, which it is. Assuming movement of the table to the left, as is consistent with Figures 1 and 6, the dog 13 strikes the pin 19 and after the aforesaid spring is compressed the valve member 49 is moved from the position shown in Figure 1, which is the position for the full traverse to the left, to the position shown in Figure 2. This stops the table because, as shown in Figure 2, not only is the port 59 cut off at this point in the movement of the valve member 49 but the exhaust port 70 is blocked and this locks the liquid in the right-hand side of the cylinder 30 and so effectively stops the table.

Figure 2:
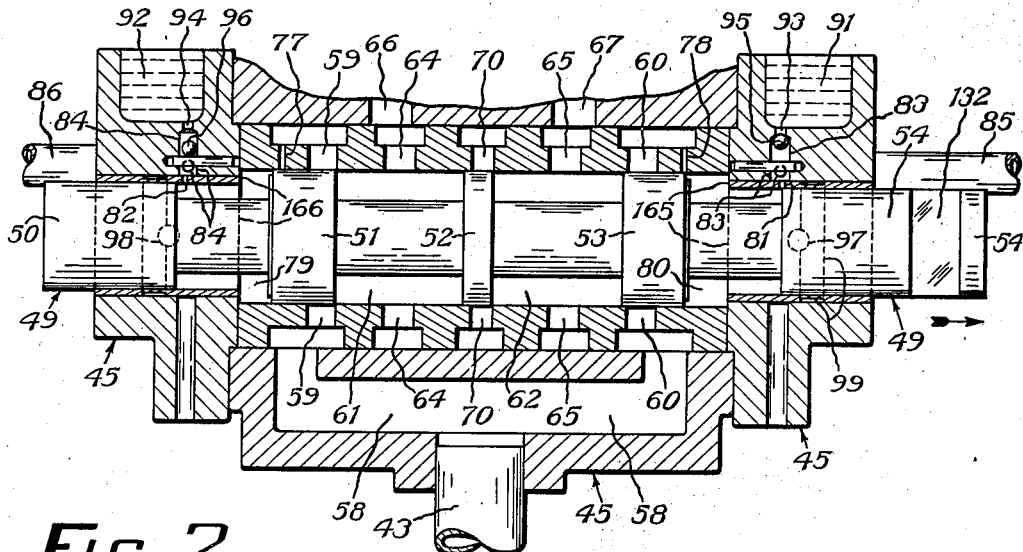
Figures 2 and 3 are enlarged horizontal sectional views of the reversing valve, showing the valve member in different positions.
Figure 3:
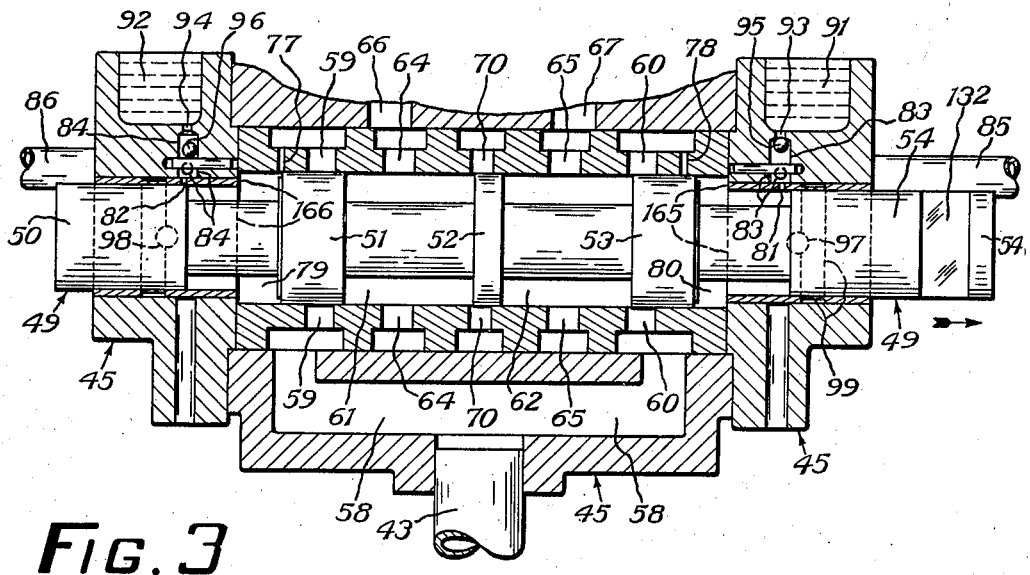

The dwell which is more particularly the subject of the present invention occurs while the valve member 49 is moving from the position shown in Figure 2 to the position shown in Figure 3, when the table is being reversed at the left-hand end of its stroke. The valve member 49 is moved during this dwell by the loaded spring above referred to which is backed up by the table. The table is absolutely stationary and, indeed, it cannot move because the liquid in the cylinder 30 cannot escape therefrom in either direction. For not only does the blocking of the exhaust port 70 prevent fluid from exhausting from the right-hand end of the cylinder 30, but it also prevents fluid from exhausting from the left-hand end of the cylinder 30, and the "fluid" is, of course, a liquid, preferably oil, and as such incompressible. Furthermore, as will be seen in Figure 2, even the entrance ports 59 and 60 are blocked. The grinding wheel, therefore, grinds the work piece at the end of the traverse stroke over a length equal to the width of the wheel as long as the dwell continues.

Referring now to Figure 2, the valve piston 53, when the table has stopped, has just closed the port 78. The aforesaid spring action is now moving the valve member 49 to the right and fluid is forced out of the chamber 80 through a port 81 into a chamber 83 which is connected by a pipe 85 with a needle valve 87. On the other side of the valve 45 (which is symmetrical, as will be observed), a port 82 opens into a chamber 84 which is connected by a pipe 86 to a needle valve 88. The needle valves 87 and 88, respectively, are connected by pipes 89 and 90, respectively, with reservoirs 91 and 92, respectively, formed in the upper side of the casing of the valve 45. These reservoirs 91 and 92 have ports 93 and 94 connected to the chambers 83 and 84, respectively. The ports 93 and 94 are closed by ball check valves 95 and 96, but open automatically when the pressure is released to allow the oil to flow downwardly.

So far as certain features of the invention are concerned, the dwell control might be embodied in a separate or self-contained unit. But whenever the valve member 49 moves to the right beyond the position shown in Figure 2 or to the left beyond the position shown in Figure 7, oil is forced through the needle valve 87 or 88, respectively, because the valve piston 53 is greater in area than the valve piston 54 and the valve piston 51 is greater in area than the valve piston 50. This forces the valve member 49 to move slowly under the aforesaid spring pressure, and in fact by careful adjustment of the needle valves 87 and 88 a dwell of any length within wide limits can be provided at either end of the stroke. Finally, however, when the valve member 49 has reached the position shown in Figure 3, the piston portion 54 has uncovered a large port 97 which, as shown in Figure 5, is connected by an annular chamber 99 in the valve casing 45 with a vertical passage 101 in the valve casing of the valve 45 which leads to the bottom of the reservoir 91. On the other side of the valve 45 there is a port 98 similar to the port 97 which is similarly connected to the reservoir 92, this being represented diagrammatically in Figure 1 by pipes 101 and 102 connecting the ports 97 and 98 with the reservoirs 91 and 92 for free flow of oil.

Coincidentally with the uncovering of the large port 97 for free flow of oil out of the chamber 80 into the reservoir 91, the port 77 is uncovered and thus oil is admitted to the chamber 79 which causes pressure fluid movement of the valve member 49, no longer under the control of the needle valve 87, and the valve member 49 is accordingly rapidly moved to a full open position exactly opposite to that shown in Figure 1. Consequently the table 11 now moves rapidly to the right and is in similar fashion reversed again at the right-hand end of its stroke, all under the control of the needle valve 88.

Referring to Figures 1, 4 and 7, a speed control or throttle valve casing 105 is connected to the casing of the valve 45. In the casing 105 is a valve member 106 having piston portions 107 and 108. The casing 105 is provided with a V-shaped port 109 which is located at one end of a passage 110 (shown in part as a pipe 110a in Figure 1) leading from the exhaust port 70. A passage or outlet pipe 111 serves to exhaust fluid from a throttle valve chamber 112 into the reservoir within the base of the machine. The throttle valve is thus located in the exhaust side of the system so as to maintain pressure in the cylinder 30.

The throttle valve member 106 is arranged so that it may be rotated and also moved axially. In the preferred construction, the end of the valve piston 108 is a plane surface which, instead of being at right angles to the axis of the valve member 106, is arranged at an angle thereto. By rotating the member 106, a fine adjustment of the throttling action may be obtained, more or less of the V-port 109 being cut off. Referring to Figure 7, a gear 113 with V shaped teeth is formed on the member 106 and a spring-pressed pawl 114 is carried by the valve casing, thus resiliently holding the valve member 106 in adjusted position. At the same time this allows the valve 106 to be moved (in a manner more fully disclosed in the aforesaid patent to Wood) to bring a valve chamber 115 into position to connect chambers 66 and 67 (extended on Figure 1 by pipes 66a and 67a) to by-pass the fluid between the ends of the cylinder 30, thereby stopping the table in any desired position.

Referring now to Figures 4, 7 and 8, the reversing lever 20 is fastened to the front end of a shaft 120 which is journalled in a casing 10a on the base 10. Fastened to the rear end of the shaft 120 by means of a key 121 and a nut 122 is a hub 123 of an arm 124. The arm 124 has a hole 125 therein through which passes a pin 126 projecting forwardly from an arm 127 that is journalled on the hub 123. The pin 126 fits loosely in the hole 125, thus providing a lost motion connection between the arms 124 and 127. A spring 128 fits partly in a casing 129 and partly in a similar casing 130, respectively formed in the arms 124 and 127, and thereby urges them into angular alignment while permitting a few degrees of angular displacement between them. Projecting rearwardly from the arm 127 is an actuating pin 131 which fits in a groove 132 in the valve member 49. Thus, as before stated, the valve member 49 and the reversing lever 20 are connected by a lost motion connection and a spring which provides the spring actuation of the valve member 49 previously referred to.

The needle valves may be of any desired type but, as shown in Figure 1, may comprise valve casings 150 having chambers 151 and 152 separated by webs 153 in which are openings just fitting needles 154 on the end of spindles 155 which have screw threaded portions 156 engaging internally screw threaded portions in cap members 157 the tops of which are closed by flanged collars 158. The spindles 155 may be turned by wheels 160. This construction permits accurate adjustment of the dwell and the needle valves can be closed so tightly that the machine will stop altogether with the table in the dwell position and can be opened so wide that reversal is fairly rapid and may be adjusted to any intermediate position.

In the operation of the machine the table 11 supports in any suitable way a work piece or a grinding wheel to move one in relation to the other. The traversing and reversing mechanism herein described reciprocates the table 11, causing it to stop at each end of the stroke for a length of time determined by the adjustment of the respective needle valves 87 and 88. For example, when the table is moving to the left, the valve 49 is in the position shown in Figure 1. When the dog 13 strikes the projection 19 of the reversing lever 20, the spring 128 is compressed because there is pressure in the chamber 80 resisting movement of the valve member 49. When, however, the side of the hole 125 reaches the pin 126, the valve member 49 is moved to the position shown in Figure 2, thus stopping the table and holding it rigidly in position. The valve member 49 now moves from the position shown in Figure 2 to the position shown in Figure 3 solely by the action of the spring 128 resisted by the needle valve 87 which, of course, may be adjusted to any position desired by the handle 160. As well shown in Figures 2, 3 and 7, the balls 95 and 96 nearly fill the chambers 83 and 84 and thus they quickly check the flow of oil through the ports 93 and 94 and the needle valves 87 and 88 govern the dwell.

The dwell is ended when the valve member 49 reaches the position shown in Figure 3 for at that time the port 97 is opened and the fluid flows freely outwardly from the chamber 80. At the same time, fluid enters the chamber 79 and the valve member 49 moves by pilot actuation until the right-hand side of the valve member 53 contacts a shoulder 165 in the chamber 80. By that time the table 11 is rapidly moving to the right. The actuation of the valve 59 is, therefore, mechanical from the position shown in Figure 1 to the position shown in Figure 2, by spring pressure from the position shown in Figure 2 to the position shown in Figure 3, and by fluid pressure pilot actuation from the position shown in Figure 3 onward to a position exactly opposite to that shown in Figure 1. Since the valve is symmetrical and all chambers, ports and pipes are duplicated at each side of the machine, reversal at one end of the stroke takes place in the same manner as reversal at the other end of the stroke, the valve member 49 being held at the left-hand end of the stroke by a shoulder 166. However, the time period of the dwell can be varied within wide limits by adjusting the needle valves 87 and 88.

In accordance with the cross feed mechanism fully described in the patent to Wood referred to, the grinding wheel is fed into the work piece at the commencement of the dwell. The parts and connections causing this infeed are not herein shown since they may be identical with those shown in the patent to Wood referred to, and they fit into the parts and the fluid pressure system herein shown without any interference whatsoever, as will readily be seen by comparing this application with the patent to Wood referred to. This is an advantage because the end portions of the locus of the work piece which is being ground can be ground right down to the smallest diameter during the dwells and then during the traverse of the table the center portion of the work piece can be level to these end portions, resulting in a work piece of uniform diameter.

The reason why I provide reservoirs 91 and 92 above the valve member 49 is so that when either the chamber 79 or 80 is enlarging, oil will be provided to fill it either through passage 97 or 98 at the start or through passage 81 or 82 later on. Thus air is kept out of the system. If air is allowed to enter the fluid pressure system, irregular movements of the valves and table result.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

A reversing valve mechanism comprising a valve casing, a movable valve member in said casing, a reversing lever, a lost motion connection between said valve member and said reversing lever, a spring also connecting said valve member to said lever, piston and cylinder means mechanically connected to said valve member, a restricted orifice connected to said cylinder, a pilot actuating device mechanically connected to said valve member, and a large orifice also connected to said cylinder, the parts being so arranged that when the reversing lever is moved the spring is loaded and the valve member moves at a rate determined by the size of the restricted orifice until the large orifice is uncovered, at which time the pilot actuated device shifts the movable valve member the remaining distance to cause reversal of an operating part.

CARL G. FLYGARE.